Patented Feb. 9, 1937

2,070,248

UNITED STATES PATENT OFFICE 2,070,248

NITROCELLULOSE PRODUCT

Richard Weingand and Arnold Muchlinski, Bomlitz, near Walsrode, Germany, assignors to Sylvania Industrial Corporation, Fredericksburg, Va., a corporation of Virginia No Drawing. Application October 10, 1934, Serial No. 747,808. In Germany February 13, 1934

15 Claims. (Cl. 18—57)

The invention relates in general to products having a matte appearance and, in particular, to an improved process for the production of nitrocellulose products, especially endless tubing, having a matte appearance.

Endless tubing made of viscose or other cellulose solutions, heretofore in commercial use as sausage casings, are entirely transparent and give the finished sausage an appearance very different from that of natural casings, a circumstance which makes it difficult to introduce them into the trade. With a view to giving artificial sausage casings an appearance similar to that of natural casings, it has been proposed to add to the cellulose solutions certain fillers such, for example, as barium sulphate and paraffin oil for producing a matte appearance. The use of fillers, however, has the disadvantage, among others, that they impair materially the strength of the finished product, in addition to which they do not give a matte appearance to the artificial casings of sufficient richness and, further, impart a roughened surface to the product.

It is an object of the invention to provide an improved article from nitrocellulose having a matte appearance of great richness and an attractive dull lustre, and a process of producing the same.

It is a specific object of the invention to provide an improved artificial sausage casing from nitrocellulose having a matte appearance simulating, in effect, the appearance of natural animal casings.

It is a further specific object of the invention to provide a process for the production of artificial sausage casings having a matte appearance simulating that of natural animal casings without impairing the tensile strength or surface smoothness of the casing.

Other objects of the invention will in part be obvious and will in part appear hereinafter.

It has now been discovered that all the practical requirements both as to appearance and strength may be met by the manufacture from nitrocellulose, of products having a matte appearance without the use of fillers, the matte appearance being derived essentially from the physical structure of the nitrocellulose. The process of the invention consists in the joint operation of several factors which determine the properties that the desired casing must have. Such factors comprise, in general, the nitrogen content and viscosity of the nitrocellulose employed, the nature of the nitrocellulose solvent and the nature of the precipitating bath.

A primary factor is the nitrogen content of the nitrocellulose. It has been found desirable to employ a nitrocellulose having a nitrogen content of between 11.6% and 12.4%, preferably about 12.1% by weight. The nitrocellulose is dissolved in a suitable solvent, preferably a mixture of ether and alcohol. An additional factor in achieving the desired matte appearance in the product is the proportion of ether to alcohol in the solvent mixture. It has been found preferable that the proportion by weight of ether to alcohol should lie between 1:1 and 1:4. Further, the matte appearance and silky lustre of the products from nitrocellulose is most satisfactory when the nitrocellulose solutions are as highly concentrated and as highly viscous as possible. The solutions should contain preferably between 15% to 25% by weight of nitrocellulose and have a viscosity of from about 20,000 to 100,000 poises. The term "poise" designates the unit of absolute viscosity in the C. G. S. system and is defined in Webster's New International Dictionary, second edition, 1935 as "the absolute viscosity of a fluid that would require a shearing force of one dyne to move a square centimeter area of either of two parallel layers of the fluid, one centimeter apart, with a velocity of one centimeter per second relative to the other layer, the space between the layers being filled with the fluid." The products are produced from such solutions in a known manner by the use of a suitable precipitating bath containing a non-solvent of the nitrocellulose. The bath is preferably one which brings about a rapid coagulation of the nitrocellulose such, for example, as an aqueous bath.

By way of illustration, but not by way of limiting the scope of the invention, there may be given the following example for the preparation of artificial sausage casings having a matte appearance. To prepare such casings, 20 kg. of nitrocellulose having a nitrogen content of 12.05% by weight are immersed and agitated in 80 kg. of a solvent consisting of by weight 60 parts of alcohol and 20 parts of ether until a substantially homogeneous mass is obtained. The conditions of the manufacture of the nitrocellulose must be such that the solution thus produced has a viscosity of about 50,000 poises. This solution is extruded through a suitable annular orifice at the rate of about five meters per minute into a suitable coagulating bath such, for example, as a bath consisting of 75% water, 20% alcohol and 5% ether wherein the nitrocellulose is precipitated. The resulting tube is washed and then denitrated by immersing it in a bath consisting of 5% sodium hydro-sulfide in water for about 75 minutes at a temperature of from 25°–32° C. As a result of this treatment, the nitrocellulose is denitrated until the nitrogen content falls to about 2% or less, preferably 0.2% to 0.5% by weight. The partially denitrated tube is then washed, softened, dried and otherwise finished in the usual manner.

The partially denitrated cellulose casing resulting from the above process is characterized by having a matte appearance which simulates the physical appearance of animal casings to such a degree that it can hardly be distinguished, even by an expert, from a natural casing when seen on the finished sausage. The matte appearance is due essentially to the physical structure of the ntrocellulose and which structure is not affected during the de-nitration of the nitrocellulose. In addition, the artificial casing of the invention has a smooth surface and a tensile strength equal to transparent casings of cellulose or cellulose compounds and also exhibits good resistance to bursting on account of its high elasticity. These advantages are the same whether the artificial casing consists wholly of nitrocellulose or whether it is in a wholly or partially denitrated condition.

While specific reference has been made in the above description to endless tubing, the process of the invention is not limited thereto, but may be employed for the production of nitrocellulose products in the form of filaments, films, bands, hollow bodies and molded articles all characterized by having a matte appearance of great richness and attractive dull, silky lustre.

Since certain changes in carrying out the above process and certain modifications in the article which embodies the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. In the claims the term "solution" as used with reference to the nitrocellulose is intended to include both true solutions thereof, as well as colloidal solutions, or mixtures in which the nitrocellulose is substantially uniformly dispersed.

We claim:

1. In a process for the production of nitrocellulose pellicles having a matte appearance, the step comprising coagulating in an aqueous bath a nitrocellulose containing from about 11.6% to 12.4% by weight of nitrogen from a concentrated and relatively viscous solution thereof in a solvent comprising ether and alcohol, the proportion of ether and alcohol lying between 1:1 and 1:4.

2. In a process for the production of nitrocellulose pellicles having a matte appearance, the steps comprising preparing a nitrocellulose containing from about 11.6% to 12.4% by weight of nitrogen, dissolving said nitrocellulose in a solvent comprising ether and alcohol in a proportion lying between 1:1 and 1:4, the mixture having a viscosity of from about 20,000 to 100,000 poises and coagulating the nitrocellulose in an aqueous bath.

3. In a process for the production of nitrocellulose pellicles having a matte appearance, the steps comprising preparing a solution of from 15% to 25% of nitrocellulose containing from about 11.6% to 12.4% by weight of nitrogen in a solvent comprising ether and alcohol in a proportion lying between 1:1 and 1:4, the solution having a viscosity of from about 20,000 to 100,000 poises and coagulating the nitrocellulose in an aqueous bath.

4. In a process for the production of nitrocellulose pellicles having a matte appearance, the steps comprising preparing a solution of from 15% to 25% of nitrocellulose containing from about 11.6% to 12.4% by weight of nitrogen in a solvent comprising ether and alcohol in a proportion lying between 1:1 and 1:4, the solution having a viscosity of from about 20,000 to 100,000 poises and coagulating the nitrocellulose in a bath comprising water and alcohol.

5. In a process for preparing seamless, flexible tubing having a matte appearance, from nitrocellulose, the steps comprising preparing a solution of from 15% to 25% of nitrocellulose containing from about 11.6% to 12.4% by weight of nitrogen in a solvent comprising ether and alcohol in a proportion lying between 1:1 and 1:4, the solution having a viscosity of from about 20,000 to 100,000 poises, extruding said solution through an annular orifice and coagulating the nitrocellulose in an aqueous bath.

6. In a process for preparing artificial sausage casings having a matte appearance, from nitrocellulose, the steps comprising preparing a solution of from 15% to 25% of nitrocellulose containing from about 11.6% to 12.4% by weight of nitrogen in a solvent comprising ether and alcohol in a proportion lying between 1:1 and 1:4, the solution having a viscosity of from about 20,000 to 100,000 poises, extruding said solution through an annular orifice and coagulating the nitrocellulose in a bath comprising water and alcohol.

7. As an article of manufacture, a pellicle comprising a coagulated nitrocellulose characterized by having a substantially uniform matte appearance, a silky lustre and a relatively smooth surface, the matte appearance being derived essentially from the physical structure of the nitrocellulose.

8. As an article of manufacture, a seamless, flexible tubing comprising a coagulated nitrocellulose and characterized by having a substantially uniform matte appearance, a silky lustre and a relatively smooth surface, the matte appearance being derived essentially from the physical structure of the nitrocellulose.

9. As an article of manufacture, an artificial sausage casing comprising a seamless tubing formed of a coagulated nitrocellulose which has been partially denitrated, said casing having a substantially uniform matte appearance simulating the appearance of a natural animal casing, the matte appearance being derived essentially from the physical structure of the partially denitrated nitrocellulose.

10. As an article of manufacture, an artificial sausage casing comprising a seamless, flexible tubing formed of a coagulated nitrocellulose which has been denitrated until the nitrogen content is not more than 2% by weight, said casing being characterized by having a substantially uniform matte appearance simulating the appearance of a natural animal casing, the matte appearance being derived essentially from the physical structure of the partially denitrated nitrocellulose.

11. In a process for the production of nitrocellulose products having a matte appearance, the steps comprising preparing a nitrocellulose containing from about 11.6% to 12.4% by weight of nitrogen, dissolving said nitrocellulose in a solvent comprising ether and alcohol in a proportion lying between 1:1 and 1:4 to form a relatively viscous solution, extruding said nitrocellulose solution through an annular orifice, coagulating the nitrocellulose in an aqueous bath and denitrating the nitrocellulose until the nitrogen content is not substantially more than 2% by weight.

12. In a process for the production of nitrocellulose pellicles having a matte appearance, the steps comprising preparing a nitrocellulose containing from about 11.6% to 12.4% by weight of nitrogen, dissolving said nitrocellulose in a solvent comprising ether and alcohol in a proportion lying between 1:1 and 1:4, the mixture having a viscosity of from about 20,000 to 100,000 poises, coagulating the nitrocellulose in an aqueous bath and denitrating the nitrocellulose.

13. In a process for the production of nitrocellulose pellicles having a matte appearance, the steps comprising preparing a solution of from 15% to 25% of nitrocellulose containing from about 11.6% to 12.4% by weight of nitrogen in a solvent comprising ether and alcohol in a proportion lying between 1:1 and 1:4, the solution having a viscosity of from about 20,000 to 100,000 poises, coagulating the nitrocellulose in an aqueous bath and partially denitrating the nitrocellulose.

14. In a process for preparing artificial sausage casings having a matte appearance, from nitrocellulose, the steps comprising preparing a solution of from 15% to 25% of nitrocellulose containing from about 11.6% to 12.4% by weight of nitrogen in a solvent comprising ether and alcohol in a proportion lying between 1:1 and 1:4, the solution having a viscosity of from about 20,000 to 100,000 poises, extruding said solution through an annular orifice, coagulating the nitrocellulose in a bath comprising water and alcohol and partially denitrating the nitrocellulose.

15. As an article of manufacture, an artificial sausage casing comprising a seamless, flexible tubing of regenerated cellulose derived from nitrocellulose and characterized by having a substantially uniform matte appearance, a silky lustre and a relatively smooth surface, the matte appearance being derived essentially from the physical structure of the regenerated cellulose.

RICHARD WEINGAND.
ARNOLD MUCHLINSKI.